Figure 2:
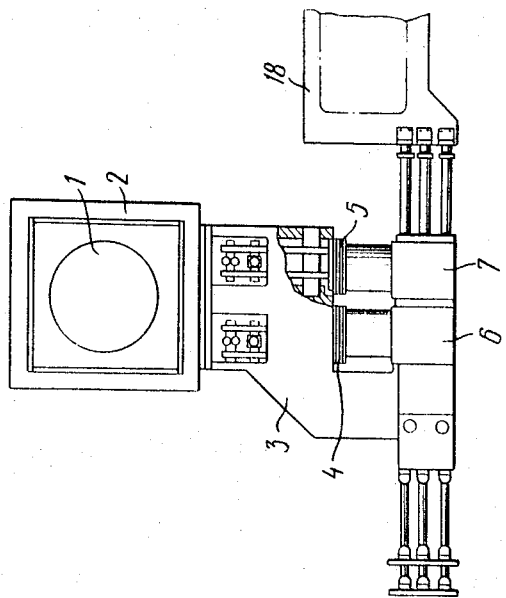
Figure 1:
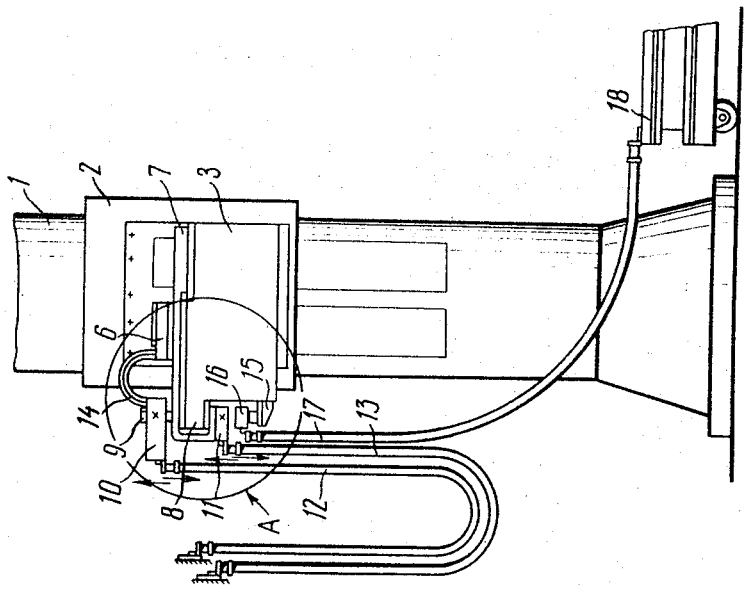

United States Patent [19]
Medovar et al.

[11] 3,783,168
[45] Jan. 1, 1974

[54] ELECTROSLAG REMELTING PLANT

[76] Inventors: Boris Izrailevich Medovar, bulvar Lesi Ukrainki, 2, kv. 8; Viktor Andreevich Popov, ulitsa Andreevskaya, 11, kv. 2; Jury Fedorovich Alferov, bulvar Lepse, 29, kv. 64; Alexei Georgievich Bogachenko, ulitsa Leskova, 9, kv. 1; Jury Vadimovich Latash, ulitsa Artema, 55, kv. 23, all of Kiev, U.S.S.R.

[22] Filed: July 7, 1972

[21] Appl. No.: 269,816

[52] U.S. Cl. .......................................... 13/9, 13/14
[51] Int. Cl. ............................................ H05b 3/60
[58] Field of Search ..................... 13/14–17, 9 ES

[56]            References Cited
          UNITED STATES PATENTS
3,614,284  10/1971  Scheidig.............................. 13/14 X
3,670,089  6/1972  Paton .................................. 13/9 ES

*Primary Examiner*—Roy N. Envall, Jr.
*Attorney*—John C. Holman et al.

[57]            ABSTRACT

An electroslag remelting plant comprising two shoes insulated from each other and interconnected by means of a rigid joint, one of them being connected by a flexible coupling to current-collecting means of the first electrode and, on being traversed, being allowed to establish a contact with the other current-collecting means of second electrode, whereas the second shoe, on being traversed, establishes a contact with a current-collecting means of the second electrode or with the third spring-biased shoe associated electrically with a base plate.

1 Claim, 3 Drawing Figures

ELECTROSLAG REMELTING PLANT

The present invention relates to electrometallurgy and more particularly to electroslag remelting plants.

Depending on the outline of the ingots being melted either an "electrode-base plate" or "electrode - electrode" circuit connection diagram is employed for the electroslag remelting of metals and alloys at metallurgical works.

Known in the art are electroslag plants for remelting a single and more electrodes in which current flows along the "electrode - base plate" circuit as well as those adapted for remelting two and more electrodes at a time, the current flowing in these along the "electrode - electrode" circuit.

At present a plant for the electroslag remelting of consumable electrodes comprises a mast, an electrode car, an electrode holder, current-carrying cables, a base plate and a mould (see B.I.Medovar "Electroslag Remelting," USSR, Metallurgizdat, 1965, pp.153–157).

However, in service the prior-art plants do not allow changing over from the "electrode - base plate" to "electrode - electrode" circuit connection diagram without special readjustment and replacement of the electrode holder.

For changing over from one circuit connection diagram to another the following procedure should be followed: the electrode holder is stripped and replaced; current-carrying shoes and current leads are removed and replaced with the new ones; a counterweight is detached to be fastened to another electrode holder.

The procedure takes from 7 to 10 days, the plant being out of service within that interval of time.

Also, two types of the electrode holder and current leads must be provided for one and the same plant.

Thus, a disadvantage of the prior art furnaces lies in the fact that they do not render possible the electroslag remelting in accordance with both circuit connection diagrams "electrode - base plate" and "electrode - electrode" on one and the same plant without additional erection and adjustment work.

The basic object of the present invention is to provide an electroslag remelting plant with such switching over of current leads as will ensure rapid change over from one circuit connection diagram to another, i.e., from an "electrode - base plate" to "electrode - electrode" circuit connection diagram and vice versa.

The above object is achieved by developing an electroslag remelting plant comprising a mould with a base plate and a mast which act as a guide for a car carrying an electrode holder with current-carrying cables connected to shoes, one of which is electrically associated with an electrode current-collecting means, in which plant conforming to the invention said shoe is connected to the electrode current-collecting means by a flexible coupling and is mounted to be movable until it establishes a contact with a current-collecting means of the second electrode, the second shoe being attached to be allowed to traverse from the current-collecting means of the second electrode to the third spring-biased current-collecting means associated electrically with the base plate, the first said shoes being interconnected by means of a rigid joint and insulated electrically from one another.

The above solution of the problem offers a reduction in the electroslag remelting plant (furnace) down time which results from a shorter change-over time in switching from one electrical circuit to another.

Figure 3:
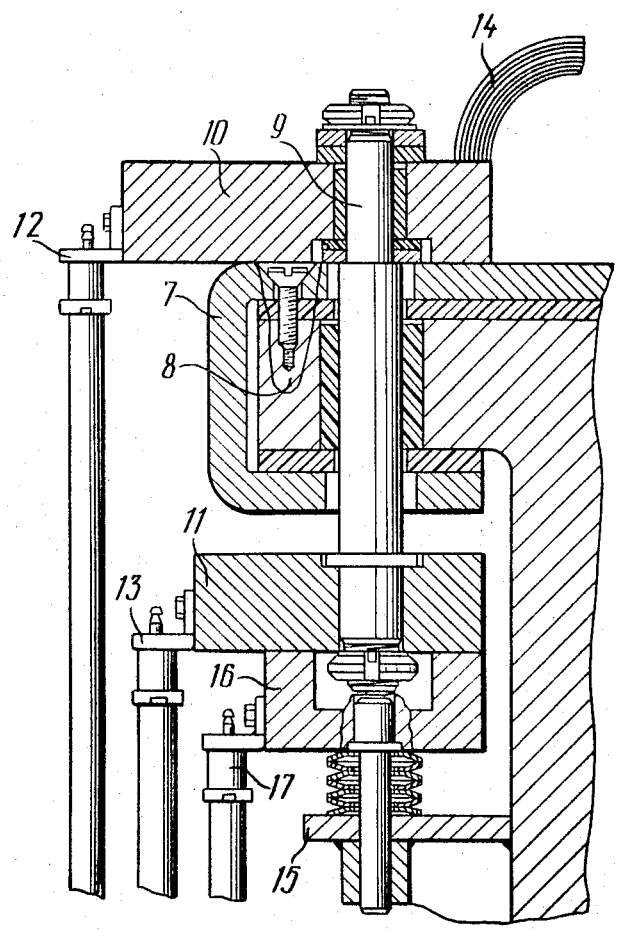

The nature of the present invention will be more fully apparent from a consideration of the following description of an exemplary embodiment thereof to be taken in conjunction with the accompanying drawings in which:

FIG.I is a general view of a plant;
FIG. 2 shows a plan view of the same plant;
FIG.3 depicts units A of FIG.I.

A plant for the electroslag remelting of metals and alloys comprises a mast I (FIGS. I and 2) to which is fastened a car 2 to be movable vertically along the mast I. The car 2 is fitted with an overhanging electrode holder 3 with an aperture which accommodates clamping blocks 4 and 5 mounted on the side. The electrode holder is attached to the car 2 and connected to an electrode clamp drive (not shown in the drawing).

In the aperture of the electrode holder 3 are arranged current-collecting plates 6 and 7 facing the clamping blocks 4 and 5 and insulated electrically from each other and from the electrode holder 3. The latter has a projection 8 with a port through which passes a pivot 9 fastened to its ends current-carrying shoes IO and II (FIG.3) arranged on both sides of the projection 8 and connected by current-carrying cables 12 and 13 with a transformer secondary winding (not shown in the drawing). Said shoes are free to move up and down. The current-collecting plate 7 bends around the projection 8 of the electrode holder 3 being attached to its lower plane. The upper current-carrying shoe IO is electrically associated with the current-collecting plate 6 with the aid of a flexible coupling I4. Mounted under the lower face of the pivot 9 on a bracket I5 of the electrode holder 3 is a spring-biased current-collector (shoe) I6 connected to a base plate I8 by cable I7. The pivot 9 is coupled with a driving gear not shown in the drawings.

The plant functions in the following manner.

One or more electrodes (depending on the remelting schematic adopted thereof) are introduced in the aperture of the electrode holder and clamped by blocks 4 and 5 to current-collecting plates 6 and 7. When remelting one or more electrodes in accordance with an "electrode - base plate" circuit connection diagram the pivot 9 is set by means of a driving gear to its lower position, an upper current-carrying shoe IO being held tight to the current-collecting plate 7 and current-carrying shoe II — engages the current-collecting spring-biased shoe I6. In this case current is supplied to one or more electrodes and to a base plate I8.

When remelting two or more electrodes in accordance with an "electrode - electrode" circuit connection diagram the pivot 9 together with the shoe IO is set to its upper position, the upper shoe IO being set off from the current-collecting plate 7 and the current-carrying shoe II being held tightly to it.

What is claimed is:

1. A plant for electroslag remelting of metal in a mould with a base plate, comprising: a vertical mast, a car movably secured to the mast and having means for vertical movement along the mast, said car having an electrode holder attached thereto which is provided with an aperture for receiving at least one electrode, said electrode holder further having a first and a second current-collecting plate and means for clamping the electrode to the current-collecting plates, said electrode holder being further provided with a horizontal projection having a port through which passes a vertical pivot bar, said pivot bar having drive means for axial movement within the port, an upper and a lower current-carrying shoe in electrical contact with a source of electric current, one shoe being attached to each end of the pivot bar on opposite sides of the projection and with the shoes being electrically insulated from each other, the upper shoe being connected electrically to the first current-collecting plate, the second current-collecting plate being positioned around the upper and lower extremity of the projection and with the upper and lower shoes being spaced sufficiently far apart so that one or the other of the upper and lower shoes may contact said second plate, depending upon the vertical position of the pivot bar with respect to the projection, and a third current-collecting plate mounted beneath the pivot bar in electrical contact with the base plate and biased upwardly, the vertical position of the second plate relative to the third plate being such that when the upper shoe is in its lowermost position in contact with with second plate, the lower shoe will be in contact with the third plate.

* * * * *